US010483565B2

(12) United States Patent
Rau et al.

(10) Patent No.: US 10,483,565 B2
(45) Date of Patent: Nov. 19, 2019

(54) FUEL CELL DEVICE, AUTOMOBILE WITH A FUEL CELL DEVICE AND METHOD FOR OPERATING A FUEL CELL DEVICE

(71) Applicants: HYUNDAI MOTOR COMPANY, Seoul (KR); KIA Motors Corporation, Seoul (KR)

(72) Inventors: Thorsten Rau, Hünfelden (DE); Andreas Kapp, Eschborn (DE)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 106 days.

(21) Appl. No.: 15/817,590

(22) Filed: Nov. 20, 2017

(65) Prior Publication Data
US 2018/0145354 A1    May 24, 2018

(30) Foreign Application Priority Data
Nov. 21, 2016   (DE) .................. 10 2016 222 935

(51) Int. Cl.
| H01M 8/04082 | (2016.01) |
| H01M 8/04746 | (2016.01) |
| H01M 16/00 | (2006.01) |
| B60L 50/72 | (2019.01) |
| B60L 58/40 | (2019.01) |

(52) U.S. Cl.
CPC ......... *H01M 8/04201* (2013.01); *B60L 50/72* (2019.02); *B60L 58/40* (2019.02); *H01M 8/04753* (2013.01); *H01M 16/006* (2013.01); *H01M 2250/20* (2013.01); *H01M 2250/402* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| 6,798,083 B2 | 9/2004 | Mueller et al. |
| 2016/0172696 A1* | 6/2016 | Milacic ............. H01M 8/04992 429/431 |

FOREIGN PATENT DOCUMENTS

| JP | 4275061 B2 * | 6/2009 |
| JP | 4275061 B2 | 6/2009 |
| KR | 10-1465325 B | 11/2014 |
| KR | 10-2015-0022310 A | 3/2015 |
| KR | 10-2015-0088514 A | 8/2015 |

* cited by examiner

*Primary Examiner* — Daniel S Gatewood
(74) *Attorney, Agent, or Firm* — McDonnell Boehnen Hulbert & Berghoff LLP

(57) ABSTRACT

The disclosure provides a fuel device for an automobile, an automobile with the fuel cell device and a method for operating the fuel cell device. The fuel cell device comprises a first pipe, a second pipe, and a pressure regulator. The first pipe connects a gas tank to a fuel cell. The second pipe connects the fuel cell with an open end of the second pipe. The fuel cell is arranged to be driven by evaporated liquefied gas contained the gas tank. The pressure regulator is arranged to control the evaporation of the liquefied gas.

13 Claims, 3 Drawing Sheets

FUEL CELL DEVICE, AUTOMOBILE WITH A FUEL CELL DEVICE AND METHOD FOR OPERATING A FUEL CELL DEVICE

CROSS-REFERENCE TO RELATED APPLICATION

This application claims priority to and the benefit of German Patent Application No. 102016222935.4 filed on Nov. 21, 2016, the entire contents of which are incorporated herein by reference.

BACKGROUND

The present disclosure relates to a fuel cell device, an automobile with such a fuel cell device and a method for operating a fuel cell device. In particular, the automobile is driven by liquefied gas (abbreviated as LG), in particular liquefied natural gas (abbreviated as LNG) or liquefied synthetic gas.

Liquefied natural gas is a natural gas that has been converted to liquid form for ease of storage or transport. It takes up about 1/600th the volume of natural gas in the gaseous state. The natural gas is typically condensed into a liquid at close to atmospheric pressure by cooling it to approximately −162° C. (−260° F.), wherein a maximum transport pressure is set at around 25 kPa (4 psi).

Liquefied natural gas achieves a higher reduction in volume than compressed natural gas (abbreviated as CNG) so that the (volumetric) energy density of LNG is 2.4 times greater than that of CNG or 60 percent that of diesel fuel. This makes LNG cost efficient to transport over long distances where pipelines do not exist.

Besides the above mentioned properties of liquefied gas, specially designed cryogenic sea vessels (LNG carriers) or cryogenic road tankers are used for its transport. LNG is principally used for transporting natural gas to markets, where it is regasified and distributed as pipeline natural gas, which can be used in natural gas vehicles.

Its relatively high cost of production and the need to store it in expensive cryogenic tanks have hindered widespread commercial use. On energy basis, LNG production is expected to increase in the near future.

Further, natural gas and synthetic gas (i.e. from biomass or Fischer-Tropsch-Synthesis) are available in huge amount. The transportation of these gases requires typically a liquefication (volumetric benefit as described above).

State of the art applications for gas usage for transportation mostly use compressed natural gas. Therefore, the liquefied gas must be transformed back from liquid to gas phase. Furthermore, to realize an acceptable operating range by reasonable tank size, the gas has to be pressurized. This process is extremely inefficient and energy consuming.

To overcome this bottleneck, such as energy waste, the liquefied gas is directly fueled in the gas tank. It is clear and mandatory that the gas tank for storage of the liquefied gas is typically extremely isolated to minimize the evaporation of the liquefied gas.

The evaporation process and related problems are explained in detail above (1 liter of liquefied gas corresponds to 600 liter natural gas as well as storage conditions of the liquefied gas). In general, evaporation of the liquefied gas is not a challenge during the driving mode of the automobile because the evaporated liquefied gas is burned in a combustion engine, for example, gas turbine or a piston engine. The challenge starts when the automobile is parked at a place with minor or no ventilation and the liquefied gas cannot be stored in special tanks according to the pressure limits of the tanks, such as, for example for Europe, "Pressure Equipment Directive 97/23/EC (PED)" (also see above). This could be, for example, a public or private parking place. During parking mode it is typically not advisable to operate the combustion engine to burn the evaporated gas. It is also dangerous to blow off the evaporated liquefied gas, because this results in toxic environment around the vehicle due to CO and/or $CO_2$ emission. For example, a garage would become a gas chamber.

Thus, liquefied gas needs the above mentioned special tank, wherein the gas must be highly pressurized, before fueling the tank, the so called compressed gas tank, of the automobile to provide a reasonable mileage.

Further, liquefied gas needs to be cooled in the liquefied gas tank. Therefore, either cooling is required or cost intensive gas management of evaporated liquefied gas is needed.

Consequently, there is a need to efficiently use the evaporated liquefied gas. There is also a need to store the liquefied gas, for example, in conventional tanks without special treatment. That is to say, there is a need to manage the evaporated liquefied gas, for example, in an automobile, in energy-saving and environment-friendly manner for widespread commercial use.

U.S. Pat. No. 6,798,083 B2 relates to a cryogenic power conditioning system for fuel cells, which is cooled by liquid hydrogen or liquid natural gas (methane) used to power these fuel cells, or by liquid nitrogen supplied by high-temperature superconducting cables.

SUMMARY OF THE DISCLOSURE

The disclosure relates to a fuel cell device in accordance with claim 1, an automobile with a corresponding fuel cell device in accordance with claim 11 and a method for operating the fuel cell device.

According to one embodiment of the disclosure, a fuel cell device for an automobile comprises a first pipe, wherein the first pipe connects a gas tank to a fuel cell, the gas tank configured to store liquefied gas, and a second pipe, wherein the second pipe connects the fuel cell with an open end of the second pipe, and a pressure regulator. The fuel cell is arranged to be driven by evaporated liquefied gas from the gas tank, wherein the pressure regulator is arranged to control the evaporation of the liquefied gas.

The fuel cell device can be easily adapted to a liquefied gas driven automobile. By adopting the fuel cell device the gas tank can have a conventional shape. In other words, the gas tank does not necessarily have a bottle type shape or geometry.

The first pipe and second pipe can comprise a polymer material, for example, rubber. Therefore, the pipes of the disclosure can be in particular flexible, whereby the adaptation of the fuel cell device in the liquefied gas driven automobile can be easily realized.

The open end of the second pipe can be configured to receive oxygen from the surrounding air. The second pipe is connected to a cathode of the fuel cell, wherein the first pipe is connected to an anode of the fuel cell. In other words, the fuel cell can be a hydrogen-oxygen-fuel cell.

The term "liquefied gas" also refers to "liquefied natural gas."

According to another embodiment of the disclosure, an automobile with a corresponding fuel cell device is presented.

According to a further embodiment of the disclosure, a method for operating the fuel cell device is presented.

One aspect of the disclosure is to guide the evaporated liquefied gas to a fuel cell to convert it to electrical power without necessarily driving the combustion engine. The electrical energy can be easily handled, either to store it in a battery or to use it for conditioning of the automobile, for example, heating or cooling. The produced energy based on the fuel cell can also be used to supply a power grid. This can be case when an electrical energy storage of the automobile, such as a battery, is fully charged.

Another aspect of the disclosure is to enable usage of liquefied gas as a highly efficient energy source for combustion engines as well as the use of the evaporated liquefied gas of the gas tank to generate electrical energy in a fuel cell in accordance to an operation mode of an automobile.

The fuel cell device can also be used in, for example, vehicles, trucks, buses or trains. Based on a further aspect of the disclosure, a further fuel treatment such as compressing or pressurization, before fueling the gas tank, is not necessarily required.

Due to very strict emission legislation (noise and pollutants), especially in the USA for trucks with liquefied gas as fuel for propulsion during a parking mode, the use of the combustion engine to provide a truck with electrical energy is challenging. Therefore, there is a need to provide the trucks with electrical power, wherein the fuel cell device is used as auxiliary power unit. Thus, the legislation is not violated, and the boil-off gas or evaporated liquefied gas is used in an efficient way. Beside the power supply of the truck, a cooling container also can be supplied with the electrical energy generated in the fuel cell device.

The fuel cell device has inter alia the advantages that the liquefied gas can be used in energy-saving and environment-friendly manner in any operation mode of the automobile. In this context, it should be understood that the term "operation mode" can be "driving mode", "stand-by mode", "idle mode" or "parking mode." Especially during parking mode or idle mode of the liquefied gas driven automobile at an area with little to no ventilation, the evaporated liquefied gas can be used efficiently.

According to a further embodiment, the pressure regulator detects an overpressure within the gas tank. The overpressure can be detected to efficiently operate the fuel cell. The pressure regulator can be turned off during the driving mode of the automobile or can be turned on during parking mode or idle mode. Alternatively, the pressure regulator can be simultaneously turned on during the driving mode of the automobile.

According to a yet further embodiment, the pressure regulator is arranged between the gas tank and the fuel cell. The pressure regulator can regulate the pressure in the gas tank due to a purge of the liquefied gas in the case of overpressure within the gas tank. That is to say, conventional gas tanks can be used to store the liquefied gas. Further, the liquefied gas can be directly fueled in the gas tank without being pressurized.

According to a still further embodiment, the first pipe comprises a first valve, wherein in the first valve is arranged between the fuel cell and the pressure regulator. The first valve can be opened after the detection of overpressure by the pressure regulator. The first valve can communicate with the pressure regulator in connection with the pressure state of the gas tank. The first valve can be a check valve or pressure valve, or any kind of valve suitable for the fuel cell device.

According to another embodiment, the second pipe comprises a compressor and a second valve, wherein the compressor is arranged between the open end of the second pipe and the second valve. In other words, the second valve is arranged between the fuel cell and the compressor. The second valve can be a check valve or pressure valve, or any kind of valve suitable for the fuel cell device. The compressor is arranged to efficiently drive the fuel cell by oxygen pressurized in the compressor. The second valve can communicate with the compressor and/or the fuel cell, wherein the second valve can be arranged to be closed or opened depending on the hydrogen concentration in the fuel cell. The hydrogen is supplied in form of evaporated liquefied gas from the gas tank via the first pipe.

According to a further embodiment, the first pipe comprises a further compressor and/or a further regulator arranged between the first valve and the pressure regulator.

According to a yet further embodiment, the first valve, the second valve, the compressor, the further compressor or the further regulator are connected to a battery control unit. The battery control unit can be further connected to the electrical energy storage. The battery control unit can communicate with the corresponding components, namely the first valve, the second valve, the compressor, the further compressor or the further regulator of the fuel cell device depending upon the charging status of the electrical energy storage, for example, a battery.

In the case when the battery is fully charged, the energy can be used to operate electrical propulsion or electrical consumer goods. Alternatively, the energy can be supplied to the power grid during driven mode. In other words, the electrical energy can be used to drive, whereby the combustion engine can remain in a "stand-by" mode. Further, the automobile can be simultaneously driven via direct propulsion of the combustion engine and electrical propulsion based on the energy generated in the fuel cell device. Alternatively, the energy can be supplied to the power grid during parking mode, for example, by using a plug-in-hybrid solution.

According to a still further embodiment, the gas tank is connected to a combustion engine via a third pipe. The liquefied gas is used to drive the combustion engine. The third pipe supplies the combustion engine with liquefied gas, when the fuel cell device is in stand-by mode or when the pressure regulator is turned off during driving mode. The automobile can alternatively be driven simultaneously via the combustion engine and the electrical propulsion, wherein the energy for the electrical propulsion is generated within the fuel cell device.

According to a further embodiment, the fuel cell, in particular, a fuel cell stack, is connected to an electrical energy storage. The fuel cell or the fuel cell stack can be arranged to be directly connected to the electrical energy storage. Alternately, the fuel cell or the fuel cell stack can be arranged to be indirectly connected to the electrical energy storage via the electrical energy storage control unit, the so called battery control unit. The electrical energy storage stores the energy produced via the fuel cell. Consequently, the fuel cell device can be continuously operated during parking mode. The electrical energy can be stored, for example, in an automobile battery or can be directly used by the electrical consumer devices of the automobile or can be supplied to the power grid.

According to a yet further embodiment, the fuel cell device operates during a parking mode or idle mode of the automobile. Therefore, the gas tank may be constructed not in view of the pressure regulation according to pressure limits of tanks such as, for example, for Europe according to the "Pressure Equipment Directive 97/23/EC (PED)."

According to a further embodiment, the disclosure comprises the method for operating the fuel cell device.

In a first step, the first pipe and the second pipe are provided, wherein the first pipe connects the gas tank to the fuel cell, and wherein the second pipe connects the fuel cell with the open end of the second pipe.

In a second step, the fuel cell is driven by the pressure regulator via the evaporated liquefied gas, wherein the evaporated liquefied gas is regulated or controlled by the pressure regulator. A detailed example for the method for operating the fuel cell device is described in connection with FIG. 5.

According to another embodiment of the disclosure, the automobile can be driven by the combustion engine as well as by the electrical propulsion, wherein the required energy to operate the electrical propulsion is supplied by the fuel cell device.

The features of the here described fuel cell device are also disclosed for the automobile with a corresponding fuel cell device and the method for operating the fuel cell device as well as vice versa.

BRIEF DESCRIPTION OF THE FIGURES

FIG. 5 is a flow diagram of a method for operating a fuel cell according to an embodiment of the disclosure.

Unless indicated otherwise, like reference numbers through the figures indicate like elements.

DETAILED DESCRIPTION OF THE DISCLOSURE

Figure 1:
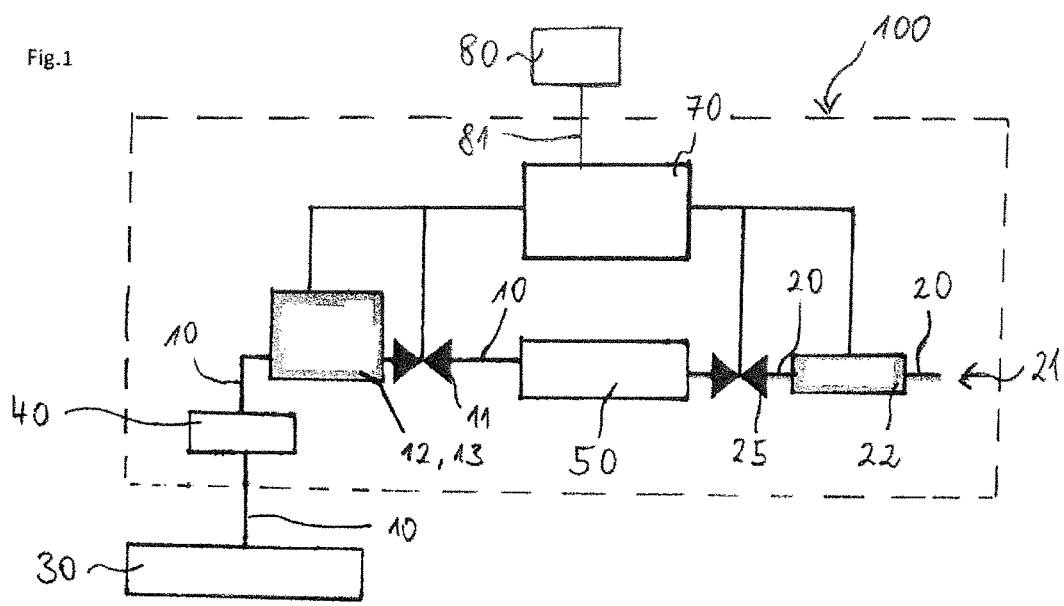
FIG. 1 is a schematic diagram to explain a functionality of a fuel cell device according to an embodiment of the disclosure.

FIG. 1 is a schematic diagram to explain a functionality of a fuel cell device according to an embodiment of the disclosure.

FIG. 1 illustrates the functionality of the fuel cell device 100 (indicated by the dotted line) for preferably an automobile 200. The fuel cell device 100 comprises a first pipe 10, wherein the first pipe 10 connects a gas tank 30 to a fuel cell 50, in particular a fuel cell stack, and a second pipe 20, wherein the second pipe 20 connects the fuel cell 50 with an open end 21 of the second pipe 20. The gas tank is configured to store liquefied gas, in particular liquefied natural gas. The open end 21 of the second pipe 20 can be configured to receive oxygen from the surrounding air. The second pipe 20 is connected to a cathode of the fuel cell 50, wherein the first pipe 10 is connected to an anode of the fuel cell 50. Further, the fuel cell device 100 comprises a pressure regulator 40.

The fuel cell 50 of the fuel cell device 100 is arranged to be driven by evaporated liquefied gas of the gas tank 30, wherein the pressure regulator 40 is arranged to control the evaporation of the liquefied gas. The pressure regulator 40 detects an overpressure within the gas tank 30. By detecting the overpressure the fuel cell device 100 can be operated efficiently. The pressure regulator 40 can be turned off during driving mode of the automobile 200 or can be turned on during parking mode.

As shown in FIG. 1 the pressure regulator 40 is arranged between the gas tank 30 and the fuel cell 50. The pressure regulator 40 can regulate the pressure in the gas tank 30 due to a purge of the liquefied gas in case of overpressure within the gas tank 30. Further, the first pipe 10 comprises a first valve 11, wherein in the first valve 11 is arranged between the fuel cell 50 and the pressure regulator 40. The second pipe 20 comprises a compressor 22 and a second valve 25, wherein the compressor 22 is arranged between the open end 21 of the second pipe 20 and the second valve 25. The compressor 22 can be arranged to efficiently drive the fuel cell 50 by oxygen pressurized in the compressor 22.

As illustrated in FIG. 1 the first pipe 10 comprises a further compressor 12 and/or a further regulator 13 arranged between the first valve 11 and the pressure regulator 40. The further compressor 12 and/or the further regulator 13 can be arranged to efficiently drive the fuel cell 50 by hydrogen of the liquefied gas pressurized in the compressor and/or regulated by the regulator.

The fuel cell device 100 further comprises a battery control unit 70. The battery control unit 70 is connected to the first valve 11, the second valve 25, the compressor 22 as well as the further compressor 12 and/or the further regulator 13 of the fuel cell device 100. The further compressor 12 and/or the further regulator 13 are arranged in the first pipe 10 between the pressure regulator 40 and the first valve 11. The battery control unit 70 can be further connected to the electrical energy storage 80 via an electrical connection 81. The battery control unit can in particular communicate with the corresponding components, namely the first valve 11, the second valve 25, the compressor 22 as well as the further compressor 12 or the further regulator 13 of the fuel cell device 100 depending on the charging status of the electrical energy storage 80, for example, a battery.

Figure 2:
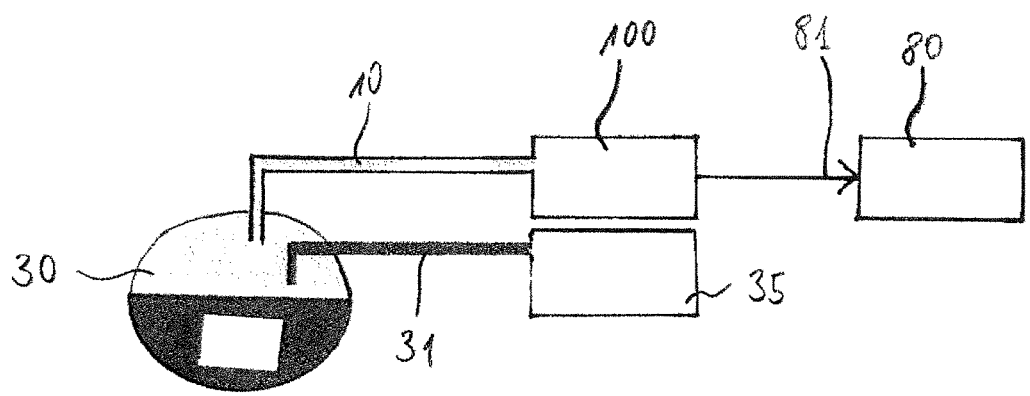
FIG. 2 is a schematic view of a fuel cell device to explain a set-up in an automobile according to an embodiment of the disclosure.

FIG. 2 is a schematic view of a fuel cell device to explain a set-up in an automobile according to embodiments of the disclosure.

FIG. 2 is generally based on the fuel cell device of FIG. 1 with the difference being that the gas tank 30 is connected to a combustion engine 35 via a third pipe 31. The combustion engine 35 is in particular driven by the liquefied gas.

Figure 3A:
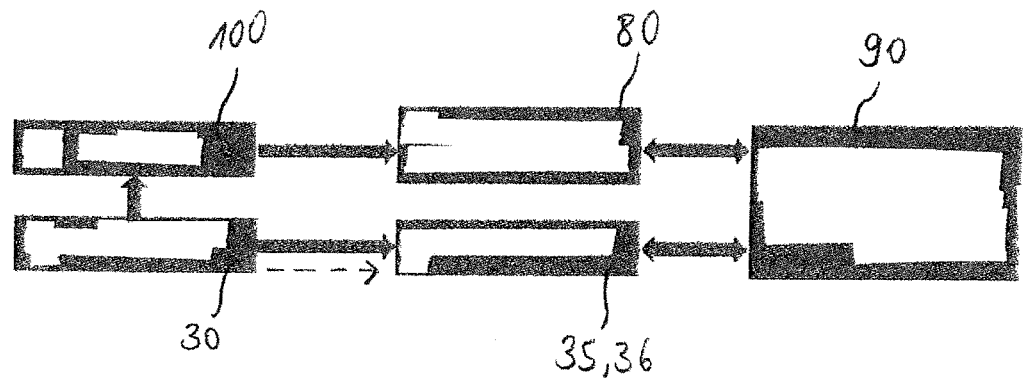
FIG. 3a-3c are schematic flow diagrams to explain functionality under different operation modes of the fuel cell device in an automobile according to embodiments of the disclosure.
Figure 3B:
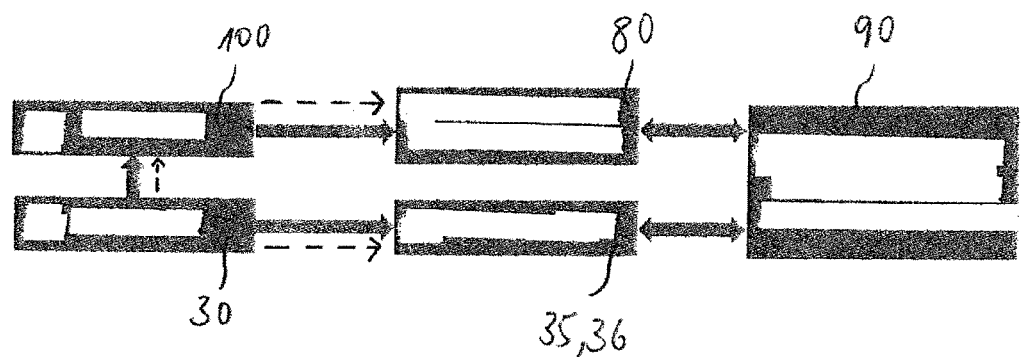
Figure 3C:
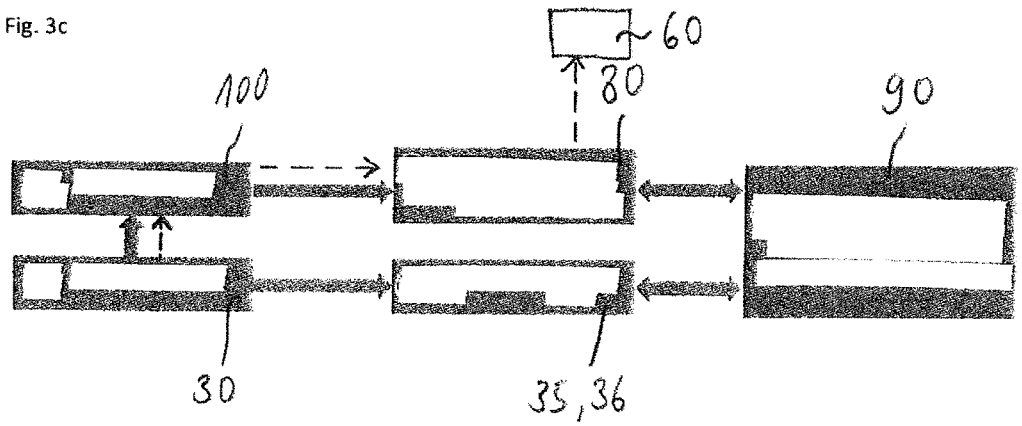

FIGS. 3a, 3b and 3c are schematic flow diagrams to explain functionality under different operation modes of the fuel cell device in an automobile according to an embodiment of the disclosure.

FIG. 1 describes the functionality of the fuel cell device 100, wherein the fuel cell devices as described in FIGS. 3a, 3b, and 3c are additionally connected to electrical devices 90. The electrical devices 90 are in particular an electrical motor for electrical propulsion, an electrical turbo or a heater, for example. In addition, the combustion engine 35 can comprise a generator 36 to produce electrical energy for the electrical propulsion. The generator 36 can be alternatively arranged between the electrical propulsion and the combustion engine 35.

FIG. 3a shows a standard engine operation mode (indicated by the arrow with dotted line). During the standard engine operation mode, the liquefied gas is burned in the combustion engine 35. The energy is used in particular for the direct propulsion of the automobile 200.

FIG. 3b shows a standard engine operation mode in connection with the electrical energy generation (indicated by the arrow with dotted line). In other words, the combustion engine 35 and the fuel cell device 100 are driven simultaneously. During the standard engine operation mode in connection with the electrical energy generation, the liquefied gas is burned in the combustion engine 35, wherein the liquefied gas is used to operate the fuel cell device 100. The gained energy can be stored in the electrical energy storage 80, for example an automobile battery. The generated energy of the fuel cell device 100 can be used for any electrical device 90 of the automobile 200, such as e-booster or electrical consumer goods of the automobile.

FIG. 3c shows a no engine operation mode of the combustion engine 35 but an operation of the fuel cell device 100 driven by the evaporated liquefied gas of the gas tank 30 (indicated by the arrow with dotted line). Under "no engine operation mode," a parking mode of the automobile 200 can be understood. During the parking mode the liquefied gas is slowly heated up and evaporates in direction of the fuel cell device 100. According to the disclosure, the evaporated liquefied gas is used to produce electrical energy via the fuel cell 50. The energy can be stored in the electrical energy storage 80 of the automobile 200. The gained energy can in particular be applied to different systems of the automobile 200, for example, air conditioning or heating system. That is to say, the energy produced by the fuel cell 50 can be used for preconditioning of the automobile. It is clear that the evaporated liquefied gas cannot be burned during the parking mode. In addition, in the case that the battery is fully charged, the generated energy of the fuel cell device 100 can be supplied to a power grid 60 of the automobile 200.

Figure 4:
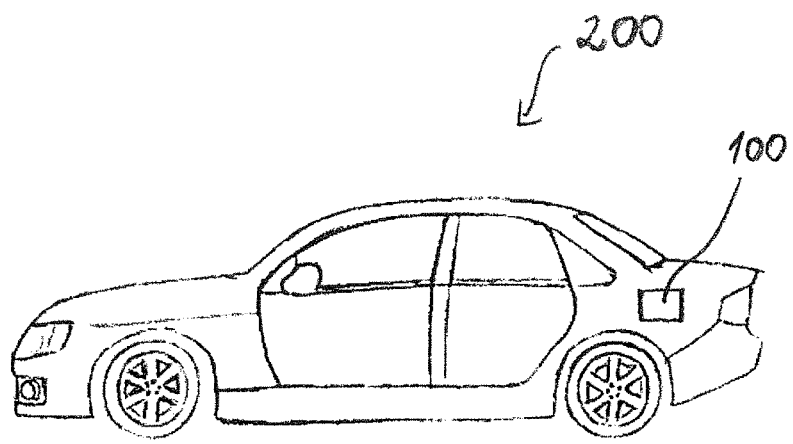
FIG. 4 is an automobile with a fuel cell device according to an embodiment of the disclosure.
Figure 4:
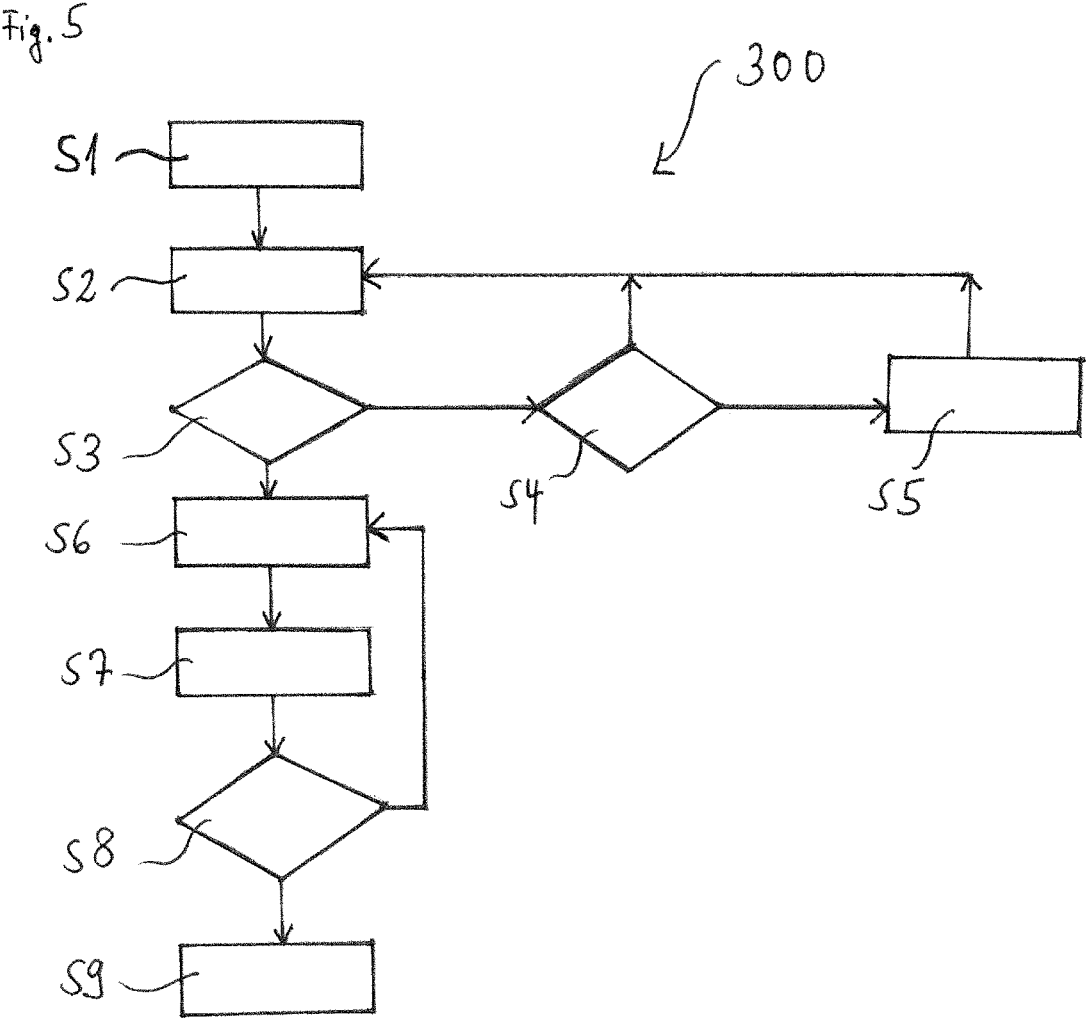

FIG. 4 is an automobile with a fuel cell device according to an embodiment of the disclosure.

FIG. 4 illustrates the automobile 200, wherein the automobile 200 includes the fuel cell device 100. The fuel cell 50 of the fuel cell device 100 operates in particular during the parking mode of the automobile. Simultaneously the fuel cell device 100 can be driven during standard engine operation as described above.

FIG. 5 is a flow diagram of a method for operating a fuel cell device 100 according to an embodiment of the disclosure.

The method preferably takes place during a parking or idle mode of the automobile 200. The arrows in FIG. 5 indicate flow directions of the method for operating a fuel cell device 100.

In a first step S1 of the method 300 for operating the fuel cell device 100, the first pipe 10 and the second pipe 20 are provided, wherein the first pipe 10 connects the gas tank 30 to the fuel cell 50, and wherein the second pipe 20 connects the fuel cell 50 with the open end 21 of the second pipe 20.

In a second step S2, the fuel cell 50 is driven by the pressure regulator 40, wherein the pressure regulator 40 detects, regulates and/or controls the pressure of the evaporated liquefied gas.

The flow diagram of FIG. 5 comprises further steps S3 to S9 to describe an exemplary method for operating the fuel cell device 100.

In step S2, the pressure regulator 40 detects the pressure in the gas tank 30, in particular, during a predetermined time. The pressure regulator 40 may be calibrated with respect to the pressure of the evaporated liquefied gas within the gas tank 30. That is to say, the pressure regulator 40 compares the pressure of the evaporated liquefied gas with a predetermined pressure value, wherein the pressure regulator 40 may start to operate the first valve 11, the further compressor 12, the further regulator 13 of the first pipe 10 and the second valve 25 and the compressor 22 of the second pipe 20 when the pressure of the evaporated liquefied gas is higher than the predetermined pressure value (at step S3). That is to say, the pressure regulator 40 detects the overpressure within the gas tank 30.

In step S3, the pressure regulator 40 detects, measures and/or determines the pressure of the evaporated liquefied gas or the overpressure within the gas tank 30 with regard to the predetermined pressure value.

If the pressure of the evaporated liquefied gas is higher than or equal to the predetermined pressure value, the method may execute step S6, wherein the first valve 11 of the first pipe 10 and the second valve 25 of the second pipe 20 are opened, for example. The compressor 22 of the second pipe 20 may be arranged to efficiently drive the fuel cell 50 by oxygen pressurized in the compressor 22 of the second pipe 20 via the open end of the second pipe 21. The second valve 25 can in particular communicate with the compressor 22 and/or the fuel cell 50, wherein the second valve 25 can be arranged to be closed or opened dependent on the hydrogen concentration in the fuel cell 50, wherein the hydrogen is supplied in the form of evaporated liquefied gas of the gas tank via the first pipe 10. In a corresponding manner, the further compressor 12 and/or the further regulator 13 of the first pipe 10 also can be driven or operated based on the overpressure.

In step S7 the pressure of the evaporated liquefied gas as well as the temperature are detected within the predetermined time. In step S8 the pressure regulator 40 measures the pressure of the evaporated liquefied gas again, for example, wherein step S8 is substantially equal to step S6. In the case that the pressure of the evaporated liquefied gas is lower than the predetermined pressure value, meaning no overpressure is detected within the gas tank, the method executes step S9.

In step S9, the method closes the first valve 11 and the second valve 25 as well as the corresponding compressors 12, 22 of the first pipe 10 and second pipe 20. If opened in step S6, the regulator 13 is also closed in step S9.

In step S8, if the pressure of the liquefied gas is still higher than the predetermined pressure (see also step S3), the method returns to or maintains step S6 automatically.

In step S3 of the method, if the pressure of the liquefied gas is not higher than or equal to the predetermined pressure value, the temperature in the gas tank 30 may be detected in step S4 of the method. For determining the temperature, a temperature sensor may be used. If the temperature in the gas tank 30 is not higher than a predetermined temperature value, the method can return to step S2 of the method (namely the pressure regulator 40 detects the pressure in the gas tank 30 during a predetermined time). If the temperature in the gas tank 30 is higher than the predetermined temperature, in step S5 of the method the predetermined time of step S2 is calibrated or readjusted to optimize the method for operating the fuel cell device 100. For example, the value of the predetermined time may be reduced, wherein after reducing the predetermined time in step S5 the method may return to step S2 of the method.

The here described method is not limited to this embodiment. It is also conceivable that the fuel cell device functions by exclusively detecting the evaporation of the liquefied gas during the operation mode of the automobile, namely the overpressure.

The here aforementioned fuel cell device has been described in connection to automobiles. However, a person skilled in the art would understand that the here described fuel cell device can be applied to various objects (for example, trucks) that include combustion engines driven by liquefied gas, in particular, natural liquefied gas.

The invention claimed is:

1. A fuel cell device for an automobile comprising:
a first pipe, wherein the first pipe connects a gas tank to a fuel cell, the gas tank configured to store liquefied gas;
a second pipe having an open end and connected to the fuel cell; and
a pressure regulator,
wherein the fuel cell is arranged to be driven by evaporated liquefied gas from the gas tank, and wherein the pressure regulator is arranged to control the evaporation of the liquefied gas, and
wherein, at a parking mode or an idle mode, the pressure regulator is configured to supply the evaporated liquefied gas from the gas tank to the fuel cell when a pressure of the evaporated liquefied gas in the gas tank is higher than or equal to a predetermined pressure value, and not to supply the evaporated liquefied gas from the gas tank to the fuel cell when the pressure of the evaporated liquefied gas in the gas tank is lower than the predetermined pressure value.

2. The fuel cell device according to claim 1, wherein the pressure regulator detects an overpressure within the gas tank.

3. The fuel cell device according to claim 1, wherein the pressure regulator is arranged between the gas tank and the fuel cell.

4. The fuel cell device according to claim 1, wherein the first pipe comprises a first valve that is arranged between the fuel cell and the pressure regulator.

5. The fuel cell device according to claim 4, wherein the second pipe comprises a compressor and a second valve, wherein the compressor is arranged between the open end of the second pipe and the second valve.

6. A fuel cell device for an automobile comprising:
a first pipe, wherein the first pipe connects a gas tank to a fuel cell, the gas tank configured to store liquefied gas;
a second pipe having an open end and connected to the fuel cell; and
a pressure regulator;
wherein the first pipe includes a first valve that is arranged between the fuel cell and the pressure regulator;
wherein the second pipe includes a compressor and a second valve, wherein the compressor is arranged between the open end of the second pipe and the second valve;
wherein the first pipe further includes a further compressor or a further regulator arranged between the first valve and the pressure regulator; and
wherein the fuel cell is arranged to be driven by evaporated liquefied gas from the gas tank, and wherein the pressure regulator is arranged to control the evaporation of the liquefied gas.

7. The fuel cell device according to claim 6, wherein the first valve, the second valve, the compressor, the further compressor or the further regulator is connected to a battery control unit.

8. The fuel cell device according to claim 1, wherein the gas tank is connected to a combustion engine via a third pipe.

9. The fuel cell device according to claim 1, wherein the fuel cell is connected to an electrical energy storage.

10. The fuel cell device of claim 9, wherein the fuel cell is a fuel cell stack.

11. An automobile having a fuel cell device according to claim 1, wherein the gas tank is connected to a combustion engine via a third pipe.

12. The automobile according to claim 11, wherein the fuel cell device operates during the parking mode, stand-by mode or driving mode of the automobile.

13. A method for operating the fuel cell device according to claim 1.

* * * * *